(12) United States Patent
Hurst (10) Patent No.: US 11,306,646 B2
(45) Date of Patent: Apr. 19, 2022

(54) CONTROL VALVE FOR A HEAT MANAGEMENT MODULE

(71) Applicant: Schaeffler Technologies AG & Co. KG, Herzogenaurach (DE)

(72) Inventor: Sebastian Hurst, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/051,823

(22) PCT Filed: May 7, 2019

(86) PCT No.: PCT/DE2019/100410
§ 371 (c)(1),
(2) Date: Oct. 30, 2020

(87) PCT Pub. No.: WO2019/214776
PCT Pub. Date: Nov. 14, 2019

(65) Prior Publication Data
US 2021/0115838 A1  Apr. 22, 2021

(30) Foreign Application Priority Data

May 8, 2018  (DE) .................. 10 2018 110 983.0

(51) Int. Cl.
*F01P 7/16* (2006.01)
*F16K 1/42* (2006.01)
(Continued)

(52) U.S. Cl.
CPC ............ *F01P 7/167* (2013.01); *F16K 1/42* (2013.01); *F01P 2007/146* (2013.01); *F16K 31/0658* (2013.01); *F16K 31/1221* (2013.01)

(58) Field of Classification Search
CPC ....... F01P 7/167; F01P 2007/146; F16K 1/42; F16K 31/0658; F16K 31/1221; F16K 27/029; F16K 31/0689; F16K 37/0041
(Continued)

(56) References Cited

U.S. PATENT DOCUMENTS 3,120,968 A   2/1964  Calvin
4,895,301 A   1/1990  Kennedy
(Continued)

FOREIGN PATENT DOCUMENTS

CN   102086799 A   6/2011
CN   102322330 A   1/2012
(Continued)

*Primary Examiner* — Yi-Kai Wang (57) ABSTRACT

A control valve for a heat management module of a motor vehicle is provided, which includes a valve disk, a valve shaft connected to the valve disk, and a shaft bearing on which the valve shaft is mounted such that it can move axially from a bearing surface. The control valve further includes a radial spring biased radially towards the shaft bearing. A receiving groove of the valve shaft includes an inhibiting section and a free-running section that are axially separated by a clamping wedge,
The radial spring, in the region of the bearing surface is unable to overcome the clamping wedge and the radial spring is pressable radially by the clamping wedge such that the valve shaft is inhibited in the axial direction away from the free-running section.
A control position can be held in a continuous manner without energy in a small installation space.

20 Claims, 3 Drawing Sheets

(51) Int. Cl.
    *F01P 7/14*         (2006.01)
    *F16K 31/06*      (2006.01)
    *F16K 31/122*     (2006.01)

(58) Field of Classification Search
    USPC ........................................................ 123/41.1
    See application file for complete search history.

(56)                   References Cited

U.S. PATENT DOCUMENTS

| | | | |
|---|---|---|---|
| 2008/0217570 A1* | 9/2008 | King | F16K 1/308 |
| | | | 251/321 |
| 2018/0195634 A1* | 7/2018 | Milivojevic | F01L 9/20 |
| 2018/0274431 A1* | 9/2018 | Tauschel | F01P 7/167 |

FOREIGN PATENT DOCUMENTS

| | | |
|---|---|---|
| CN | 106716287 A | 5/2017 |
| CN | 206338117 U | 7/2017 |
| DE | 7515533 U | 9/1975 |
| DE | 3812233 A1 | 11/1989 |
| DE | 19905466 A1 | 8/2000 |
| DE | 602004004250 T2 | 11/2007 |
| DE | 102006058507 A1 | 6/2008 |
| DE | 102013209582 A1 | 11/2014 |
| DE | 102014004668 A1 | 10/2015 |
| DE | 102015001755 A1 | 8/2016 |
| EP | 2102534 B1 | 3/2016 |
| WO | 2008076389 A1 | 6/2008 |
| WO | 2015030724 A1 | 3/2015 |

\* cited by examiner

CONTROL VALVE FOR A HEAT MANAGEMENT MODULE

CROSS-REFERENCE TO RELATED APPLICATIONS

This application is the U.S. National Phase of PCT Application No. PCT/DE2019/100410 filed on May 7, 2019, which claims priority to DE 10 2018 110 983.0 filed on May 8, 2018, the entire disclosures of which are incorporated by reference herein.

TECHNICAL FIELD

This disclosure relates to a control valve for a heat management module.

Furthermore, the disclosure relates to a heat management module with such a control valve for a motor vehicle.

BACKGROUND

Various rotary slide devices are known from the prior art, which are configured for a heat management module (HMM), also referred to as a thermal management module (TMM), for example a cooling control circuit for an internal combustion engine of a motor vehicle. From DE 10 2013 209 582 A1, there is known a gear assembly for a thermal management module. The thermal management module described therein is configured in particular for components of a coolant circuit of an internal combustion engine that are optimized for installation space. Such a rotary slide valve is driven by an electric motor and can be transferred to various positions, for example a blocking position or an open position, but also intermediate positions.

Further Prior Art

EP 2 102 534 B1: Two-stage fluid connector for a pressurized fluid reservoir;
DE 10 2006 058 507 A1: Angle valve;
DE 38 12 233 A1: Water valve;
DE 75 15 533 U: Valve;
U.S. Pat. No. 3,120,968 A: Quick coupling with ring catch;
DE 60 204 004 250 T2: Thermostatic valve for a coolant circuit;
DE 199 05 466 A1: Method for regulating the temperature of the coolant of internal combustion engines and a thermostatic valve used therefor; and,
DE 10 2014 004 668 A1: Valve.

For many applications, it is necessary to look for inexpensive solutions and to find a construction with the smallest possible installation space requirement.

SUMMARY

Proceeding therefrom, the object of the present disclosure is to at least partially overcome the disadvantages known from the prior art. The features according to the disclosure are described herein and shown in the figures.

The control valve is characterized by a radial spring which is received in a receiving groove of the valve shaft and is biased radially toward the shaft bearing. The radial spring rests radially on the shaft bearing which has a first reversing groove and a second reversing groove. The receiving groove has an inhibiting section and a free-running section, which are separated axially by means of an adjacently arranged clamping wedge. The clamping wedge includes an inhibitor ramp, which begins at the inhibiting section and slopes radially towards the bearing surface. The radial spring, in the region of the bearing surface, is unable to overcome the clamping wedge, and the radial spring can be pressed radially by the clamping wedge such that the valve shaft is inhibited in the axial direction away from the free-running section. The clamping wedge can be overcome by the radial spring in the region of the reversing grooves.

However, movement of the valve shaft in the axial direction towards the free-running section is free.

In the following, if the axial direction, radial direction, or the circumferential direction, and corresponding terms are used without explicitly indicating otherwise, reference is made to the mentioned axis of rotation.

In contrast to previously known control valves, indiscrete, that is to say any axial positions, can be kept energy-free, so as to enable a continuous regulation of the volume flow that can be interrupted by the control valve. At the same time, the structure and control of the control valve are very simple and take up little installation space.

The control valve proposed here is suitable for a heat management module of a motor vehicle and a volume flow of a cooling liquid can be set by means of this control valve. For this purpose, the control valve has a valve disk, which takes over the switchable sealing function and, for this purpose, is seated on a valve seat in a closed position and is lifted off the valve seat in an open position. In the closed position, coolant flows through the control valve to a limited extent or not at all.

To actuate the valve disk, that is to say to lift the valve disk from the valve seat and/or to press the valve disk onto the valve seat, a valve shaft is provided which is firmly connected to the valve disk. The valve shaft has an axial extension. This axial extension defines the axis of movement of the valve disk. For this purpose, the valve shaft is accommodated in a shaft bearing which has a corresponding bearing surface. The valve shaft is guided by this bearing surface and slides thereon indirectly or directly. It should be pointed out that the valve shaft is not necessarily a one-piece component, but according to one embodiment is composed of a plurality of sub-elements, for example, a separately manufactured barrel sleeve that is firmly connected to a valve shaft, for example, a one-piece valve shaft formed with the valve disk.

It is now provided here that the control valve has a radial spring. This radial spring is configured to exert a radial force on the bearing surface and consequently an axial frictional force on the bearing surface and an axial force on the valve shaft. In one embodiment, the radial spring is a snap ring which is introduced with radial bias and, in certain operating situations, can be directly clamped between the valve shaft and the running surface.

The radial spring is received in a receiving groove with a first end wall and a second end wall in such a way that the radial spring is moved along with the axial movement of the valve disk. The receiving groove is, for example, circumferential or interrupted circumferentially, for example, by means of a plurality of holes or depressions.

The receiving groove has a first axial section and a second axial section. These sections are separated from one another by means of a clamping wedge. The clamping wedge has an inhibitor ramp. In one embodiment with the valve shaft in the center of the bearing surface, the inhibitor ramp inclines radially outward from the inhibiting section towards the free-running section. The clamping wedge has a radial extent which cannot be overcome by the radial spring in the region of the bearing surface. In addition, the radial spring, seated on the inhibitor ramp of the clamping wedge, can be radially pressed with the running surface in such a way that the valve shaft cannot then be moved further in the axial direction away from the free-running section.

For this purpose, the clamping wedge can be set up in two different configurations. In a first configuration, the valve disk is connected to a drive in such a way that the valve disk can be actively lifted off the valve seat thereof. An antagonist, for example a biased axial spring, guides the valve disk again in the direction of the closed position and presses the valve disk passively against the valve seat thereof in an end position. The closed position is then the normal position. However, if the radial spring overlaps axially with the clamping wedge, the valve shaft is held as a result of the frictional engagement, that is to say the closing movement thereof is inhibited. Conversely, in a second configuration the valve disk is connected to a drive in such a way that the valve disk can only be actively pressed onto the valve seat thereof. An antagonist, for example a biased axial spring, guides the valve disk away from the valve seat. The open position is then the normal position. However, if the radial spring overlaps axially with the clamping wedge, the valve shaft is held as a result of the frictional engagement, that is to say the opening movement thereof is inhibited. The terms active and passive refer to the control of the control valve, the drive can be an electric drive and requiring power current or power voltage for active actuation of the control valve, while no power current or power voltage is necessary for passive actuation, for example as a result of utilizing mechanically stored energy of an axial spring.

Both in the inhibiting section (i.e., before the ramp incline begins) and in the free-running section, the radial spring is not biased against the running surface to such an extent that the axial movement can thereby be inhibited. Rather, the valve disk can then be moved freely. To overcome the clamping wedge so that it can be moved from the inhibiting section into the free-running section or vice versa and thus axially relative to the valve shaft, a radial widening is provided at both ends of the running surface or the predetermined travel path so that the radial spring can still radially expand further there. In such a state, the clamping wedge can be overcome by the radial spring and thus an axial relative movement with respect to the valve shaft is possible. This enables the sections to be changed for the radial spring. For example, the running surface is formed by a sleeve, which can form the bearing surface over the entire axial extension thereof.

According to one embodiment, to facilitate returning the radial spring to the radially narrower region of the running surface, that is to say the travel path, the radial spring can have on the running surface side, or axially on both sides, for example, a radially inwardly inclined rounding and/or beveling.

It should be noted that, in one embodiment, the valve shaft is arranged on the back of the valve disk in relation to the (closable) flow opening formed by the valve seat so that the valve disk is pressed against the valve seat by the valve shaft to close the flow opening (hereinafter: slide valve). In another embodiment, the valve shaft is arranged on the side of the flow opening so that the valve shaft protrudes through the flow opening. To close the flow opening, the valve disk is then pulled against the valve seat by the valve shaft (hereinafter: pull valve). This has a corresponding effect on the alignment of the clamping wedge and the desired (first or second) configuration.

According to one embodiment of the control valve, the reversing grooves are arranged at the ends of the travel path and deepened towards the ends thereof in such a way that the clamping wedge can be overcome axially by the radial spring and thus is transferable as a result of a movement of the valve shaft relative to the radial spring from the inhibiting section into the free-running section or vice versa, wherein the return grooves towards the travel path have return ramps inclined towards the bearing surface of the shaft bearing.

In this embodiment, the shaft bearing has a first reversing groove or a second reversing groove at both ends of the bearing surface. It should be noted that ordinal numbers used in the preceding and following description, unless explicitly stated otherwise, serve only to clearly distinguish or assign them to another component with the same ordinal number and do not reflect the sequence order or rank order of the components described. In particular, an ordinal number greater than one does not mean that a plurality of the components mentioned must be present. For example, in one embodiment only a second reversing groove is provided, but no first reversing groove.

The reversing grooves have a flank at the relevant end of the travel path which cannot be overcome by the radial spring. Likewise, the receiving groove has an end wall on the side axially facing away from the clamping wedge. As a result, an axial movement of the valve shaft is limited in the interaction of the respective end wall with the respective flank. This has the additional advantage that on at least one side, a mechanical stop and thus a defined end of the axial movement is created, which prevents the predetermined axial travel path from being exceeded, and can also be used as reference points for a position measurement.

The reversing groove is deepened in such a way that the radial spring can be spaced radially from the receiving groove to such an extent that the clamping wedge for the radial spring can then be overcome axially. Thus, in such a position of the radial spring in the reversing groove as a result of a movement of the valve shaft relative to the radial spring, the radial spring can be transferred from the inhibiting section into the free-running section or vice versa.

The reversing groove can have a return ramp towards the travel path. This is inclined towards the bearing surface of the shaft bearing. This facilitates the return of the radial spring in the region of the running surface of the shaft bearing. Neither a rounding nor a beveling on the radial spring is necessary therefor.

In the case of two reversing grooves, these are, for example, mirrored to one another about an (imaginary) transverse plane, the movement axis forming a normal to this transverse plane. In the (for example first) reversing groove which is arranged on the side, to which the forward movement can be inhibited by means of the clamping wedge, a transfer from the free-running section into the inhibiting section is possible. In the (then, for example, second) reversing groove, which is arranged on the side to which the forward movement cannot be inhibited by means of the clamping wedge, a transfer from the inhibiting section into the free-running section is possible.

According to one embodiment of the control valve, a return spring is provided which acts on the valve shaft with a return force in the axial direction away from the free-running section so that the axial return force presses against the radial spring with the bearing surface of the shaft bearing by means of the clamping wedge.

In this embodiment, a return spring is provided as a mechanical accumulator, and a drive for the control valve is configured only for a movement in the opposite direction to the return movement. For example, the drive is a magnet that works with the valve shaft in the manner of a solenoid valve. Here, the return spring is configured in such a way that it conveys the valve disk in the direction towards the valve seat if the control valve is a slide valve, and conveys it away from the valve seat if the control valve is a pull valve (see the above description of the embodiments of the control valve).

Thus, in this embodiment, an active actuation by means of the drive is necessary for opening the control valve designed as a slide valve and for closing the control valve designed as a pull valve. In contrast, the current axial position is held passively in the axial counter-movement by means of the return spring. If the drive is activated or the drive force overcomes the return force of the return spring, the clamping wedge is released and the control valve is moved into a new position. This movement is carried out until the drive is switched off again or the return force overcomes the drive force again.

In another embodiment, the drive is configured to actively hold the slide valve in an axial position of the control valve in cooperation with the clamping wedge. If the drive is switched off or the return spring overcomes the driving force, the clamping wedge is released and the control valve is moved to a new position. This movement is carried out until the drive is reactivated or the drive force overcomes the return force.

The return spring can be designed as a helical compression spring and is arranged to be biased between a stop of the control valve and a stop of a housing.

In one embodiment, in which the return spring loads the control valve in the closing direction, the return spring is biased in such a way that a closing force sufficient to keep the control valve closed is transmitted to the valve disk under the predetermined pressure conditions.

According to an example embodiment of the control valve, an axially sealing sealing element is provided, which can be arranged axially between the bearing surface of the shaft bearing and the valve disk, such as between the bearing surface of the shaft bearing and the return spring according to the embodiment of the above description, in such a way that the valve shaft on the bearing shaft side is protected from a liquid penetration from the valve disk side.

In this embodiment, the control valve protrudes from a dry compartment, into which no cooling liquid can penetrate, into a wet compartment, the valve disk being arranged in the wet compartment and the portion of the valve shaft which interacts with the drive and is (at least there) stored in the dry compartment. The portion which is immersed in the wet compartment in the maximum immersed position and is arranged in the dry compartment in the maximum lifted-out position can be stripped off by means of at least one sealing lip of the sealing element so that the cooling liquid remains in the wet compartment.

In the embodiment mentioned above, the return spring is arranged in the wet compartment on the valve disk side. The drive, the clamping wedge, and the entire bearing surface can be designed as dry and encapsulated from the wet compartment.

In another embodiment, the bearing surface and/or the drive is also designed to be wet. This enables to only use static seals.

According to an example embodiment of the control valve, a displacement sensor is arranged in the shaft bearing and the axial position of the valve shaft can be detected by means of the displacement sensor.

In this embodiment, the position of the valve disk can be determined at any time by means of a displacement sensor. Because the mechanical connection can be regarded as almost ideally rigid, a direct conclusion about the volume flow is possible without the need for an additional measurement, for example the flow velocity. The displacement sensor can be a measuring element which is integrated in the drive and thee data of which can be used for precise control of the drive.

According to a further aspect, the disclosure relates to a heat management module for a motor vehicle having at least the following components:
- at least one coolant circuit,
- at least one pressure source, such as a coolant pump,—at least one heat emission interface for a heat sink, the heat sink can be a cooler,
- at least one heat absorption interface for a heat source, such as a combustion chamber of an internal combustion engine,
- a control valve according to an embodiment as described above,
- wherein the coolant circuit can be opened and blocked by means of the control valve so that a volume flow of the coolant can be changed by switching the control valve.

The heat management module proposed here is configured to dissipate the heat from a heat source, for example an internal combustion engine of a motor vehicle, and to use a heat sink to supply a cooling liquid with a suitable temperature and thus heat capacity to the heat source. For this purpose, the heat management module has a coolant circuit, the coolant circuit being operable, for example, in a map-controlled manner. Furthermore, the heat management module has a pressure source, such as a coolant pump, by means of which the circulation of the coolant can be pressure-controlled, that is to say approximately at a constant pressure, is ensured in the coolant circuit.

The heat management module has a heat absorption interface for a heat source, for example a heat exchanger with a plurality of cooling fins or a connection to a heat exchange device, and a heat emission interface, for example likewise a heat exchanger with a plurality of cooling fins or a connection to a heat exchange device, for a heat sink. The heat sink can be an airstream in interaction with a radiator of a motor vehicle, the radiator additionally comprising, for example, a fan for stationary operation (no airflow).

The heat management module comprises a control valve as previously described. The control valve is configured to continuously control the coolant flow, that is to say the volume flow, wherein no coolant flows when the control valve is closed and there is a maximum volume flow when the control valve is opened to the maximum. In one embodiment, the control valve is connected in a partial circuit, for example a bypass, so that coolant flows through the partial circuit when the control valve is open and does not flow when the control valve is closed.

Since the control valve can be held in any position, potentially passively, a continuous control or regulation of the volume flow can be set without the need for complex equipment such as a spindle drive. In addition, the energy requirement of such a control valve is low.

BRIEF DESCRIPTION OF THE DRAWINGS

The disclosure described above is explained in detail below based on the relevant technical background with reference to the associated drawings, which show example embodiments. The disclosure is in no way restricted by the purely schematic drawings, while it should be noted that the drawings are not dimensionally accurate and are not suitable for defining proportions. In the figures.

DETAILED DESCRIPTION

Figure 1:
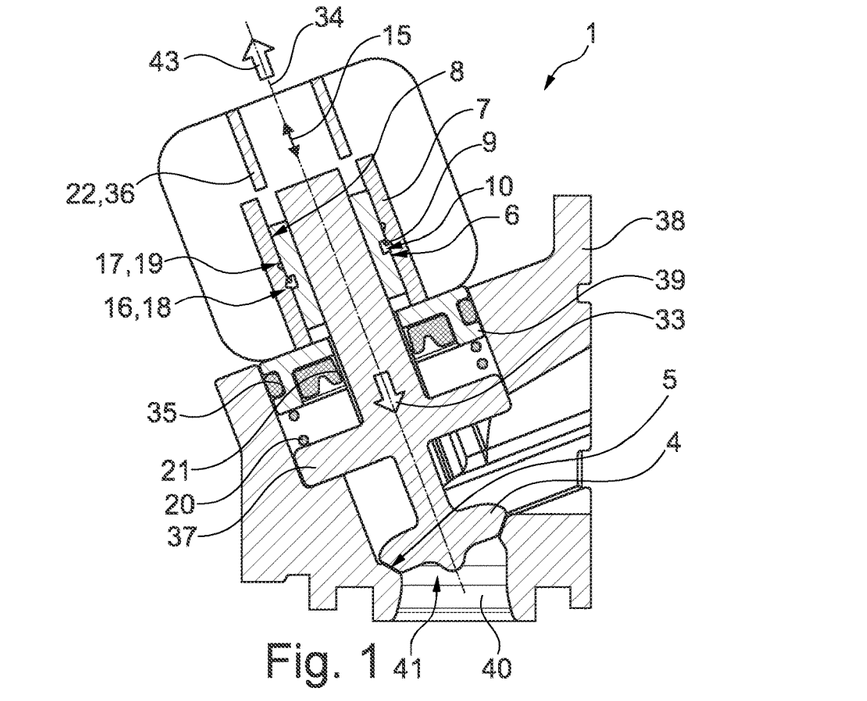
FIG. 1 shows a control valve that can be kept continuously passive.

A control valve 1 is shown in FIG. 1 in a schematic diagram, which is designed as a slide valve. That is, the valve disk 4 of the control valve 1 must be pressed from the (rear) valve shaft 6 onto the associated valve seat 5 to close the flow opening 41. In the embodiment shown, a return spring 20 is provided which, by means of the mechanically stored return force 33 thereof, presses the valve disk 4 against the valve seat 5 along the movement axis 34, i.e., in the axial direction 15, when the axial force 43 of the drive 36 (and possibly the flow forces in the coolant channel 40) is overcome. For this purpose, the return spring 20 is clamped here between a stop 37 of the control valve 1 and a housing stop 39 of the housing 38 (or here a valve closure in the housing 38 rigidly connected to the housing 38 and sealed to the outside by means of a static seal 35). Here, the return spring 20 is arranged in a wet compartment, that is to say in a compartment which is not sealed off from the coolant channel 40 by means of sealants. In the axial direction 15 toward the shaft bearing 7, the return spring is followed by a sealing means 21, here a dynamic axial seal, which prevents (cooling) liquid from entering the storage space from the wet compartment. The axial position of the valve shaft 6 and thus of the valve disk 4 is detected here by means of a displacement sensor 22, which is integrated in the drive.

The valve shaft 6, which here comprises a separate sleeve configured for bearing contact, is guided in the shaft bearing 7 by means of the bearing surface 8. The bearing surface 8 comprises a first reversing groove 16 at the first end 18 of the travel path of the control valve 1 and a second reversing groove 17 at the second end 19 of this travel path. A radial spring 9, which is designed here, for example, as a snap ring, is movable between the first end 18 and the second end 19. The radial spring 9 is received in a receiving groove 10 of the valve shaft 6 and is thus moved axially with the valve shaft 6, wherein a certain relative movement between the radial spring 9 and the valve shaft 6 is possible. This and the structure of the receiving groove 10 are explained in the following FIGS. 2 to 9.

The continuously adjusting mechanism, for example in the control valve 1 according to FIG. 1, is shown in a schematic diagram in FIGS. 2 to 9, the axial direction 15 being shown horizontally in the illustration. In the illustration above, the shaft bearing 7 is shown with the bearing surface 8, and the valve shaft 6 therebelow. The receiving groove 10 comprises an inhibiting section 11 adjacent to a first end wall 44 (here on the left, also referred to as a groove cheek) and axially adjacent thereto a free-running section 12 adjacent to a second end wall 45 (here on the right), which are separated from one another by a clamping wedge 13. The inhibitor ramp 14 rises gently radially outwards (here upwards) from the inhibiting section 11 to the free-running section 12 and drops steeply to the free-running section 12. The clamping wedge 13 is configured in such a way that the radial spring 9 cannot overcome the clamping wedge 13 when the radial spring 9 rests on the bearing surface 8. The radial spring 9 is forced against the bearing surface 8 as a result of the radially outward spring force thereof and can therefore only overcome the clamping wedge 13 if the radial spring 9 can move radially into one of the reversing grooves 16 or 17 following the radially outward spring force thereof. The radial spring 9 is thus axially entrained by the end walls 44 and 45 of the receiving groove 10 or the steep flank of the clamping wedge 13 on the free-running side. If the radial spring 9 is not in contact with an end wall 44 or 45 of the receiving groove 10 or with said steep flank of the clamping wedge 13, then there is friction with the bearing surface 8 or the system due to the radial spring force of the radial spring 9 on a flank 46 or 47 (see FIG. 3) of one of the reversing grooves 16 or 17, and a relative movement between the radial spring 9 and the valve shaft 6 takes place. If a relative movement is carried out between the radial spring 9 (standing) and the valve shaft 6 (moved) in the illustration to the left, while the radial spring 9 is somewhere in the range of travel between the reversing grooves 16 and 17 on the bearing surface 8 and in the receiving groove 10 in the inhibiting section 11, the radial spring is pressed radially against the bearing surface 8 by the inhibitor ramp 14 of the clamping wedge 13 in such a way that the applied axial force (acting here to the left) of the resulting opposing axial frictional force of the radial spring 9 in the interaction of the clamping wedge 13 and the bearing surface 8 cannot be overcome. The functional sections 11, 12 and 14 of the receiving groove 10 are only identified in FIG. 2, but are of course identical in FIGS. 3 to 9 and have been omitted for the sake of clarity. The wedge 13 separating the functional sections 11 and 12 is identified for orientation only. Likewise, only the first reversing groove 16 and the second reversing groove 17 are identified more precisely in FIG. 3, of course being identical in the remaining FIGS. 2 and 4 to 9, and the identification has been omitted for the sake of clarity. The first reversing groove 16 has a steep (first) flank 46 at the first end 18 of the travel path of the valve shaft 6, i.e., in the illustration on the left, which cannot be overcome by the radial spring 9 if, due to the biasing thereof, the radial spring is introduced radially outward into the first reverse groove 16. On the other hand, i.e., on the right in the illustration, a (first) return ramp 48 is provided, which enables the radial spring 9 carried by the first end wall 44 of the receiving groove 10 to return (to the right) into the radially narrower region of the bearing surface 8 against the biasing thereof. The second reversing groove 17 is constructed in the same way and function, here mirror identical.

Figure 7:
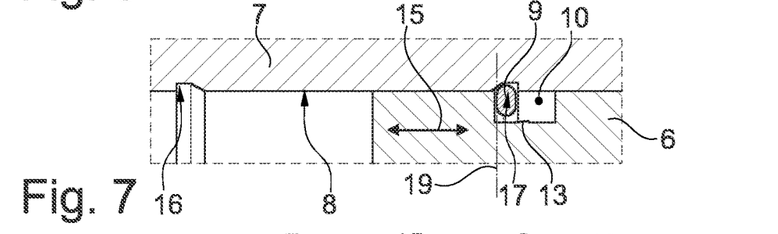
FIG. 7 shows the continuously adjusting mechanism with the valve shaft at the second end.

The (second) flank 47, here on the right, limits the axial movement of the radial spring 9 and thus (in interaction with the first end wall 44 of the receiving groove 10) the axial movement of the valve shaft 6 (FIG. 7). The (second) return ramp 49, here on the left, enables the radial spring 9, which is carried by the second end wall 45 of the receiving groove 10, to return (to the left) into the radially narrower region of the bearing surface 8 (compare the change from the state according to FIG. 8 to the state according to FIG. 9).

This continuously adjusting mechanism is explained below using the application example as shown in FIG. 1 and reference is made to FIG. 1 without further comment, with FIGS. 2 to 9 pointing left to the valve disk 4 and right to the drive 36, a movement to the left is a movement towards the closed position of the valve disk 4 and a movement to the right is a movement to open the control valve 1. In principle, however, a rotated relative assignment of the orientation of the inhibitor ramp 14 of the clamping wedge 13 to the return spring 20 and the drive 36 is also possible and/or an opposite direction 15 for closing the control valve 1, as well as another type of antagonistic drive means for moving the valve shaft 6.

Figure 2:
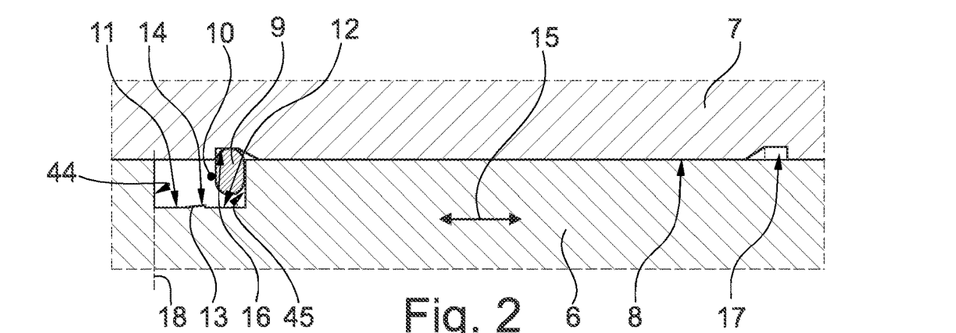
FIG. 2 shows the continuously adjusting mechanism with the valve shaft at the first end.

FIG. 2 shows a position in which (according to FIG. 1) the valve disk 4 is closed normally (default) in the contact with the valve seat 5, which contact is biased by means of the return spring 20, and without an active drive. The valve shaft 6 is thus located at the first end 18 of the travel path, which is identified here on the first (left, inhibiting section side) end wall 44 of the receiving groove 10. The radial spring 9 sits in the first reversing groove 16 and is in contact with the second (right, free-running side) end wall 45 of the receiving groove 10, wherein the second end wall 45 thus forms the end stop for the travel path of the control valve 1 by means of the radial spring 9 and the first flank 46 of the first reversing groove 16. However, this (left) end stop can be configured only a safety stop and the travel path in this direction can be limited only by the valve disk 4 and the valve seat 5 to ensure a sufficient force reservoir for closing the control valve 1 and to avoid a double fit.

Figure 3:
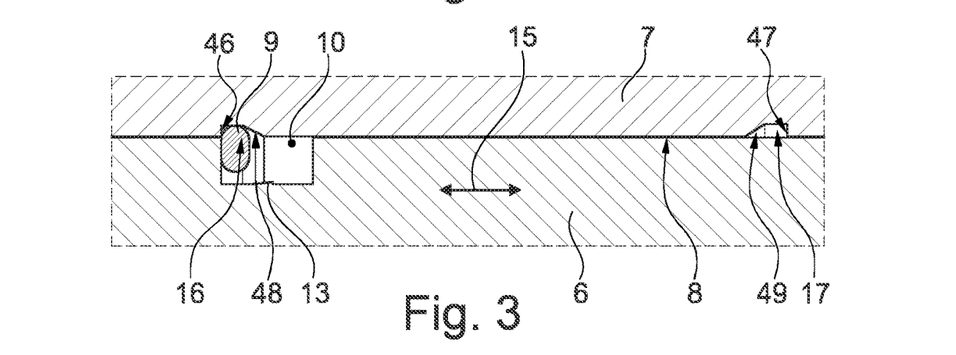
FIG. 3 shows the continuous adjusting mechanism shortly before being pushed out of the first reversing groove.

In FIG. 3, starting from the position shown in FIG. 2, the valve shaft 6 is moved in the open direction by means of the drive 36, i.e., to the right. The valve disk 4 lifts out of the contact thereof with the valve seat 5 against the biasing of the return spring 20. The radial spring 9 comes into contact with the first (left, inhibiting section side) end wall 44 of the receiving groove 10.

Figure 4:
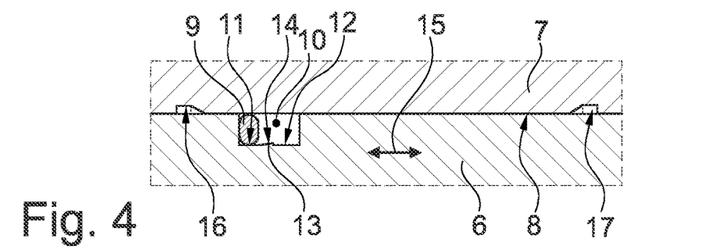
FIG. 4 shows the continuous adjusting mechanism with the radial spring in the region of the bearing surface in the inhibiting section.

FIG. 4 shows the further course of the movement of the valve shaft 6 (to the right) towards the second reversing groove 17 as a result of the axial force 43 of the drive 36 from the position shown in FIG. 3. The radial spring 9 is pressed out of the first reversing groove 16 by the first (left, inhibiting section side) end wall 44 of the receiving groove 10 via the (first) return ramp 48 and is thereby compressed radially inward (that is, below). The valve shaft 6 can now be actuated continuously along the axial direction 15, as a result of which the control valve 1 is opened ever further.

Figure 5:
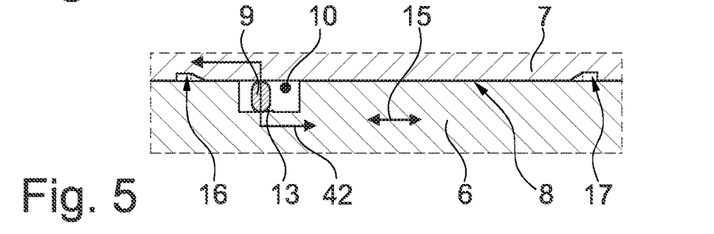
FIG. 5 shows the continuously adjusting mechanism in the clamped position.

FIG. 5 shows a position which occurs when the displacement sensor 22 or the control electronics have detected that a desired position of the valve shaft 6 has been reached. Then the active actuation by means of the drive 36 is ended. Thereupon, the return spring 20 again pushes the valve shaft 6 closed a little (to the left) until after a short distance the clamping wedge 13 comes into contact with the radial spring 9 and, as a result of the return force 33 of the return spring 20, the three components (valve shaft 6, radial spring 9 and bearing surface 8) are clamped to each other. This results in an axially acting clamping force 42, which means that the set position is held without energy by the return force 33. This works at any point on the bearing surface 8 and the position held without energy is thus continuously adjustable. The short distance required for clamping is precisely predictable and can therefore easily be taken into account in the control electronics for a precise control of the held position of the valve disk 4.

Figure 6:
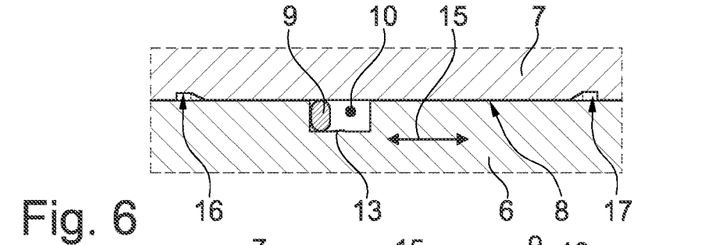
FIG. 6 shows the continuously adjusting mechanism released again with the radial spring in the region of the bearing surface in the inhibiting section.

FIG. 6 now shows how the position shown in FIG. 5, which is held without energy, is exited again, namely by the drive 36 again applying an axial force 43 which overcomes the return force 33 of the return spring 20. The biasing of the return spring 9 between the clamping wedge 13 and the bearing surface 8 is now released due to the relative movement between the radial spring 9 and the valve shaft 6 or the receiving groove 10. The valve shaft 6 continues in the open direction (to the right). As shown in FIG. 5 and the associated explanation, each position on the way to the second reversing groove 17 can be biased again without energy.

Figure 8:
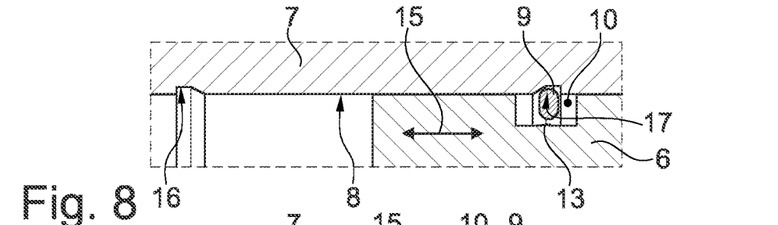
FIG. 8 shows the continuously adjusting mechanism with the radial spring while overcoming the clamping wedge.
Figure 9:
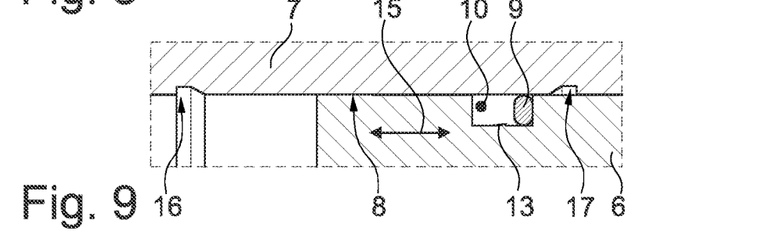
FIG. 9 shows the continuously adjusting mechanism with the radial spring in the region of the bearing surface in the free-running section.

FIGS. 7 to 9 show how a new position which is closed can be approached from the current position. For this purpose, the second reversing groove 17 must first be approached. There the radial spring 9 slides radially outward into the reversing groove 17 and widens correspondingly radially (FIG. 7). Here, the second end 19 of the travel path (in analogy to FIG. 2 with reference to the first end wall 44 of the receiving groove 10) is identified with the control valve 1 being open to the maximum, because the first end wall 44, the radial spring 9 and the (second) flank 47 of the second reversing groove 17 together form a second (right) end stop.

FIG. 8 shows how, as a result of the enlargement of the inner diameter of the radial spring 9 (when axial force 43 of the active movement is removed by means of the drive 36), the clamping wedge 13 is overcome by the radial spring 9 (moved axially by the return force 33 of the return spring 20) and thus is transferred into the free-running section 12 (see FIG. 2).

FIG. 9 shows how the second end wall 45 of the receiving groove 10 of the valve shaft 6 now transports the radial spring 9 in the direction of the first reversing groove 16, namely passively by means of the return force 33. A biasing in a desired position cannot take place in this process; rather, the process must be started again from the lower reversing groove, see FIG. 2.

Figure 10:
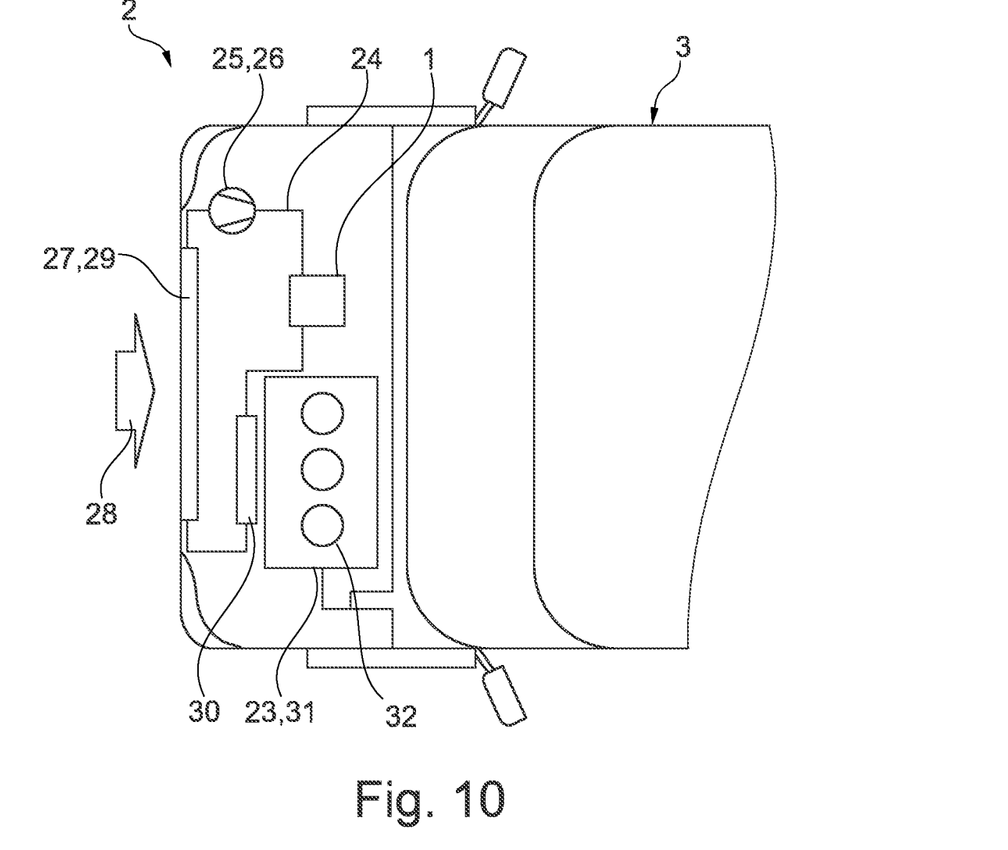
FIG. 10 shows a heat management module in a motor vehicle.

FIG. 10 shows in detail a motor vehicle 3 in which a heat management module 2, comprising a coolant circuit 24 for the internal combustion engine 23, is shown in the engine compartment, that is, where the internal combustion engine 23 is arranged. The coolant circuit 24 connects a heat absorption interface 30, here in the case of the internal combustion engine 23, the combustion chambers 32 of which thus represent the heat source 31, and a heat emission interface 27 which, for example, by means of (air)stream, which represents the heat sink 28, uses a cooler 29 for heat emission. The coolant in the coolant circuit 24 is conveyed by the pressure source 25, for example a coolant pump 26. The coolant circuit 24 here has a control valve 1, which is designed, for example, as shown in FIG. 1. The volume flow of the coolant circuit 24 can be controlled by means of the control valve 1. In this case, the pressure source 25 can be regulated in a constant-pressure manner so that the volume flow increases when the control valve 1 is opened.

With the control valve proposed here, a control position can be held in a continuous manner, potentially without energy, with simple means in a small installation space.

LIST OF REFERENCE CHARACTERS

1 Control valve
2 Heat management module

3 Motor vehicle
4 Valve disk
5 Valve seat
6 Valve shaft
7 Shaft bearing
8 Bearing surface
9 Radial spring
10 Receiving groove
11 Inhibiting section
12 Free-running section
13 Clamping wedge
14 Inhibitor ramp
15 Axial direction
16 First reversing groove
17 Second reversing groove
18 First end
19 Second end
20 Return spring
21 Sealing element
22 Displacement sensor
23 Internal combustion engine
24 Coolant circuit
25 Pressure source
26 Coolant pump
27 Heat emission interface
28 Heat sink
29 Cooler
30 Heat absorption interface
31 Heat source
32 Combustion chamber
33 Return force
34 Movement axis
35 Static seal
36 Drive
37 Valve stop
38 Housing
39 Housing stop
40 Coolant channel
41 Flow opening
42 Clamping force flow
43 Axial force
44 First end wall
45 Second end wall
46 First flank
47 Second flank
48 First return ramp
49 Second return ramp

The invention claimed is:

1. A control valve for a heat management module of a motor vehicle, the control valve comprising:
a valve disk configured to rest on a valve seat in a closed position,
a valve shaft connected to the valve disk, the valve shaft configured to move along a predetermined travel path defined by a first end stop and a second end stop, and the valve shaft having a receiving groove, the receiving groove including:
an inhibiting section,
a free-running section, and
a clamping wedge configured to axially separate the inhibiting section and the free-running section, and
a shaft bearing configured to support the valve shaft such that the receiving groove can move axially within the shaft bearing, the shaft bearing having at least one reversing groove,
a radial spring disposed within the receiving groove of the valve shaft, the radial spring biased radially towards the shaft bearing,
wherein: i) when the radial spring is moved in a first axial direction to a region of the shaft bearing between the first and second end stops, movement of the valve shaft in a second axial direction is inhibited by the clamping wedge, and ii) when the radial spring is received in a first one of the at least one reversing groove, the clamping wedge can be overcome by the radial spring so that the valve shaft can move in the second axial direction.

2. The control valve of claim 1, further comprising a second one of the at least one reversing groove, wherein the first one and second one of that at least one reversing groove are arranged at respective first and second ends of the predetermined travel path of the valve shaft, and when the radial spring is received by the first one of the at least one reversing groove, movement of the valve shaft in the second axial direction is inhibited, and when the radial spring is received by the second one of the at least one reversing groove, movement of the valve shaft in the first axial direction is inhibited.

3. The control valve of claim 1, further comprising a return spring configured to provide a return force on the valve shaft in the second axial direction.

4. The control valve of claim 1, further comprising an axially sealing element arranged axially between the shaft bearing and the valve disk, such that the valve shaft on a bearing shaft side is protected against ingress of liquid from a valve disk side.

5. The control valve of claim 1, further comprising a displacement sensor arranged on the shaft bearing, the displacement sensor configured to detect an axial position of the valve shaft.

6. A heat management arrangement for a motor vehicle, the heat management arrangement comprising:
a coolant circuit,
a pressure source,
a heat emission interface for a heat sink,
a heat absorption interface for a heat source,
and a control valve according to claim 1, wherein the coolant circuit can be opened and blocked by means of the control valve, so that a volume flow of the coolant can be changed by switching the control valve.

7. The control valve of claim 1, wherein a position of the valve shaft can be held at one of any axial position between the first and second end stops as the valve shaft moves in the first axial direction from the first end stop to the second end stop.

8. The control valve of claim 1, wherein the one of any axial position can be held passively without electrical energy.

9. The control valve of claim 2, wherein the first one and the second one of the at least one reversing groove are configured as the respective first and second end stops.

10. The control valve of claim 1, wherein movement of the valve shaft in the second axial direction is inhibited by a radially pressing of the radial spring by the clamping wedge.

11. The control valve of claim 10, wherein the clamping wedge includes an inhibitor ramp inclined radially towards the bearing.

12. The control valve of claim 11, wherein the inhibitor ramp slopes radially toward the bearing from the inhibiting section to the free-running section, forming the inhibitor ramp, and drops steeply to the free-running section.

13. The control valve of claim 3, wherein the return spring biases the valve disk to the closed position.

14. A control valve for a heat management module of a motor vehicle, the control valve comprising:
- a valve disk configured to rest on a valve seat in a closed position,
- a valve shaft connected to the valve disk, the valve shaft having a receiving groove, the receiving groove having a clamping wedge,
- a shaft bearing configured to support the valve shaft such that the valve shaft can move longitudinally within the shaft bearing, the shaft bearing having a first reversing groove,
- a radial spring disposed within the receiving groove of the valve shaft, the radial spring biased radially towards the shaft bearing, and
- in a first axial position of the valve shaft, the radial spring is received by the first reversing groove so that movement of the valve shaft is inhibited in a first axial direction by a first end wall of the receiving groove and a first flank of the first reversing groove, and
- in a second axial position of the valve shaft, the radial spring directly contacts a bearing surface of the shaft bearing, and
- wherein the bearing surface is outside of the first reversing groove so that movement of the valve shaft is inhibited in the first axial direction by the clamping wedge, and the clamping wedge is configured to radially press the radial spring towards the bearing surface.

15. The control valve of claim 14, wherein the valve shaft can be held in the second axial position without electrical energy.

16. The control valve of claim 14, further comprising a second reversing groove arranged on the shaft bearing, and in a third axial position of the valve shaft, the radial spring is received by the second reversing groove so that movement of the valve shaft is inhibited in a second axial direction by a second end wall of the receiving groove and a second flank of the second reversing groove.

17. The control valve of claim 16, wherein during movement of the valve shaft from the third axial position to the second axial position, the first end wall directly contacts the radial spring.

18. The control valve of claim 17, wherein during movement of the valve shaft from the third axial position to the second axial position, the radial spring is moved out of the second reversing groove via a return ramp arranged on the second reversing groove.

19. The control valve of claim 16, further comprising a return spring configured to provide a return force on the valve shaft in the first axial direction to move the clamping wedge towards the radial spring.

20. The control valve of claim 19, wherein the return spring and the valve disk are arranged within a wet compartment of the control valve.

* * * * *